United States Patent
Coyle et al.

(10) Patent No.: US 12,457,178 B2
(45) Date of Patent: Oct. 28, 2025

(54) NIC PRIORITY QUEUE STEERING AND PROCESSOR UNIT FREQUENCY TUNING BASED ON PACKET FLOW ANALYTICS

(71) Applicant: Intel Corporation, Santa Clara, CA (US)

(72) Inventors: David Coyle, Limerick (IE); Brendan Ryan, Westbury (IE); John J. Browne, Limerick (IE); Jeffery G. Oliver, Happy Valley, OR (US); Pallavi Manaji Kadam, Portland, OR (US); Sunku Ranganath, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 933 days.

(21) Appl. No.: 17/359,303

(22) Filed: Jun. 25, 2021

(65) Prior Publication Data

US 2021/0320881 A1   Oct. 14, 2021

(51) Int. Cl.
*H04L 12/28* (2006.01)
*H04L 47/2441* (2022.01)
*H04L 47/263* (2022.01)
*H04L 47/625* (2022.01)
*H04L 47/628* (2022.01)
*H04L 47/6295* (2022.01)
*H04L 47/70* (2022.01)
*H04L 47/80* (2022.01)
*H04L 49/90* (2022.01)

(52) U.S. Cl.
CPC ........ *H04L 47/627* (2013.01); *H04L 47/2441* (2013.01); *H04L 47/263* (2013.01); *H04L 47/628* (2013.01); *H04L 47/6295* (2013.01); *H04L 47/805* (2013.01); *H04L 47/822* (2013.01); *H04L 49/90* (2013.01)

(58) Field of Classification Search
CPC . H04L 47/627; H04L 47/6295; H04L 47/628; H04L 47/2441; H04L 47/263
See application file for complete search history.

(56) References Cited

U.S. PATENT DOCUMENTS

| 9,918,146 B2 | 3/2018 | Rana et al. |
| 10,225,183 B2 | 3/2019 | Chayat et al. |
| 10,860,374 B2 | 12/2020 | Hearn et al. |

(Continued)

FOREIGN PATENT DOCUMENTS

| EP | 3886385 A1 * | 9/2021 | ....... G06F 16/90335 |
| WO | WO-2022139808 A1 * | 6/2022 | |

OTHER PUBLICATIONS

Zhang et al., FloWatcher-DPDK: Lightweight Line-Rate Flow-Level Monitoring in Software, Sep. 2019, IEEE, pp. 1143-1156. (Year: 2019).*

(Continued)

*Primary Examiner* — Elisabeth Benoit Magloire
(74) *Attorney, Agent, or Firm* — Alliance IP, LLC

(57) ABSTRACT

In one embodiment, a system comprises a network interface controller comprising circuitry to determine per-flow analytics information for a plurality of packet flows that are received at the network interface controller and to facilitate differential rate processing of a plurality of packet queues for the plurality of packet flows based on the per-flow analytics information.

27 Claims, 6 Drawing Sheets

(56) References Cited

U.S. PATENT DOCUMENTS

| | | | |
|---|---|---|---|
| 10,868,743 B2 | 12/2020 | Slaight et al. | |
| 11,115,289 B1* | 9/2021 | Haefner | H04L 41/147 |
| 2004/0213243 A1* | 10/2004 | Lin | H04L 47/2441 |
| | | | 370/468 |
| 2013/0315237 A1* | 11/2013 | Kagan | H04L 47/2441 |
| | | | 370/389 |
| 2018/0302328 A1* | 10/2018 | Keith | H04L 43/026 |
| 2020/0028795 A1* | 1/2020 | Tiwary | H04L 47/6275 |
| 2021/0075732 A1 | 3/2021 | Singh et al. | |
| 2024/0283817 A1* | 8/2024 | Harada | H04L 63/1458 |

OTHER PUBLICATIONS

"Understanding DPDK—Description of techniques used to achieve high throughput on a commodity hardware" as accessed Sep. 27, 2021, https://www.slideshare.net/garyachy/dpdk-44585840 (36 Pages).
USPTO; U.S. Appl. No. 17/133,112, filed Dec. 23, 2020; 48 pages.

* cited by examiner

FIG. 4

| Score | Core Frequency (GHz) | Maximum Duration (seconds) |
|---|---|---|
| 5 | 2.4 | 300 |
| 6 | 2.6 | 180 |
| 7 | 2.8 | 120 |
| 8 | 3.0 | 80 |
| 9 | 3.2 (turbo) | 60 |
| 10 | 3.2 (turbo) | 60 |

NIC PRIORITY QUEUE STEERING AND PROCESSOR UNIT FREQUENCY TUNING BASED ON PACKET FLOW ANALYTICS

BACKGROUND

A computer system may include at least one processor, associated memory modules, and one or more network interface controllers (NICs) providing communication with one or more networks. The computer system may receive packets via the one or more NICs and the received packets may be provided to one or more processor units for processing.

BRIEF DESCRIPTION OF THE DRAWINGS

FIG. 4 illustrates a flow for in accordance with certain embodiments.

Like reference numbers and designations in the various drawings indicate like elements.

DETAILED DESCRIPTION

Figure 1:
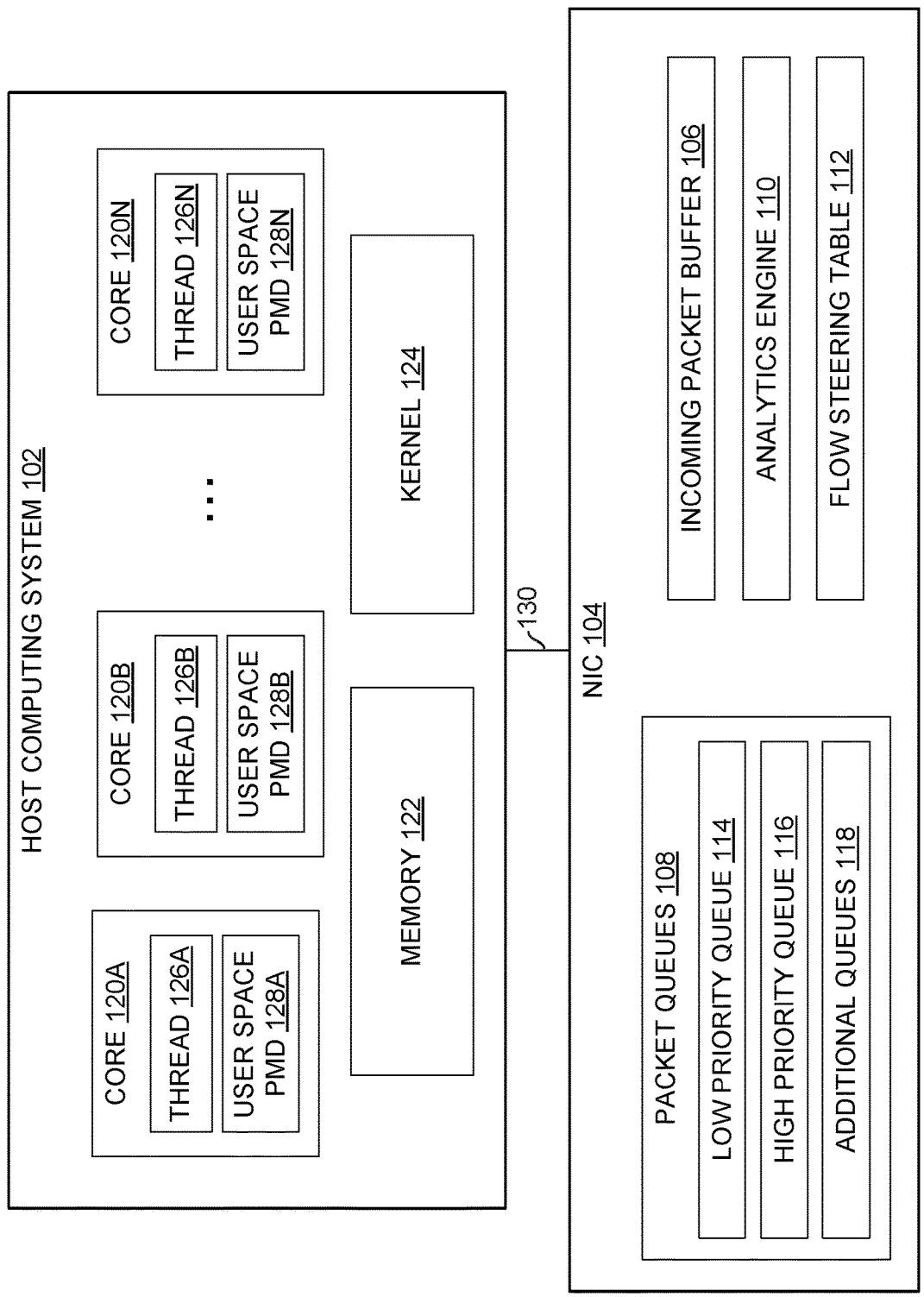
FIG. 1 illustrates a system for NIC priority queue steering based on packet flow analytics in accordance with certain embodiments.

FIG. 1 illustrates a computing system 100 in accordance with certain embodiments. The system 100 comprises a host computing system 102 and a network interface controller (NIC) 104 coupled together through a link 130 (e.g., a Peripheral Component Interconnect Express (PCIe) link or other suitable communication link). NIC 104 receives packets on behalf of host computing system 102. NIC 104 includes an incoming packet buffer 106, packet queues 108, analytics engine 110, and flow steering table 112. Host computing system 102 includes a plurality of cores 120 (e.g., 120A-120N), memory 122, and kernel 124. One or more cores 120 may poll packet queues 108 of the NIC 104 to determine whether packets are ready to be transferred from the NIC 104 to the host computing system 102 and may direct transfer of available packets from the NIC 104 to the host computing system 102 (e.g., into memory 122) for processing.

In various embodiments, a computing system (e.g., 100, 300, or 500) may provide differential rate processing of packet queues through one or both of NIC priority queue steering and core frequency tuning based on real-time packet flow analytics. NIC 104 may be capable of performing analytics for various packet flows received at NIC 104 to generate per-flow analytics information describing one or more characteristics of the packet flows. As just one example, per-flow size metrics such as the average packet size for packets of each flow may be determined. The per-flow analytics information may then be used to steer packets onto NIC packet queues (e.g., 108) having different priorities or to provide information to the host computing system 102 to allow the host computing system 102 to utilize a core that is suited for processing the packet queue onto which the packets are placed, where processing may refer to polling or other processing (e.g., operations on the packets after polling takes place, such as network stack operations).

In some embodiments, the host computing system 102 may adjust the frequency of a core polling (or otherwise processing packets of) a queue based on analytics information provided by the NIC 104. In additional embodiments, the adjustment of the frequency of a polling core (or core processing the packets) may be further based on the current platform configuration (e.g., frequencies of other cores).

In some embodiments, when flows of small packets are detected by the NIC 102, these flows are steered to a high priority queue 116 which is being polled (or otherwise processed) by a core (e.g., 120A) running at a relatively high frequency (e.g., to improve processing performance of such packets) while other packet flows with larger packets are steered to a low priority queue 114 being polled (or otherwise processed) by a different core (e.g., 120B) running at a frequency lower than the core polling the high priority queue 116 (e.g., in order to save power while still meeting processing performance requirements). Additionally or alternatively, when bursts of small packets are detected on the NIC 102, guidance indicating such may be provided from the NIC 104 to the host computing system 102 to allow the host computing system 102 to determine whether to increase the frequency of the core polling (or otherwise processing) the queue to which such packets will be steered. Thus, in various embodiments, packet bursts or flows requiring extra processing resources will be processed by a core running at a high frequency while packets bursts or flows requiring fewer processing resources will be processed by a core running at a lower frequency.

In various embodiments, performing packet analytics on the NIC 104 and steering the packets to an appropriate queue or providing guidance to the host computing system 102 allows the system 100 to be proactive in using a core that is suited for polling and/or processing certain packet bursts or flows. Some embodiments may provide improvements in one or more of power consumption, processing efficiency, improved core utilization, robustness, flexibility, and scalability.

Although portions of this description focus on operations performed by cores (e.g., polling MC packet queues and processing packets) and adjusting characteristics of the cores (e.g., operating frequencies), various embodiments may apply to any suitable processor unit that may perform such operations or exhibit such characteristics, such as a central processing unit (CPU), processor core, graphics processing unit, hardware accelerator, field programmable gate array, neural network processing unit, artificial intelligence processing unit, inference engine, data processing unit, or infrastructure processing unit. Thus, any of the references herein to a core may contemplate references to any suitable processor unit.

FIG. 1 focuses on components of a system that may be used for NIC priority queue steering. When packets are received by NIC 104, the packets may be placed in an incoming packet buffer 106 where analytics are performed on the packets by analytics engine 110 before the packets are steered to a packet queue 108. In some embodiments, the number of packets that are stored in the incoming packet buffer 106 may be fixed or configurable by circuitry of the NIC 104 (e.g., responsive to a command received from host computing system 102). In various embodiments, any suitable number of packets may be stored at one time in the incoming packet buffer 106.

As used herein, an analytics instance may refer to an iteration of analytics performed by the analytics engine 110. During an analytics instance, a group of packets may be analyzed. For example, the packets that are stored in the incoming packet buffer 106 (or a portion thereof) may be analyzed during an analytics instance. Thus, during a first analytics instance, packets stored in the incoming packet buffer may be analyzed by the analytics engine 110 and then the packet buffer 106 may be refilled with additional received packets and these packets may be analyzed during a second analytics instance and so on.

In various embodiments, the analytics may be performed on the packets in the incoming packet buffer 106 on a per-flow basis. For example, the packets analyzed during an analytics instance may include packets from various flows. The analytics engine 110 may generate per-flow analytics information which includes separate analytics information for each flow having packets within the analytics instance.

The analytics engine 110 may parse various parameters from the incoming packets in order to determine which flows the packets belong to in conjunction with performing analytics on the packets. A flow of packets may refer to a plurality of packets that are related in some manner. As just one example, a flow may comprise packets of a connection (e.g., a Transmission Control Protocol/Internet Protocol (TCP/IP)) between a source and a destination. In one example, a flow of packets may be identified by an Internet Protocol (IP) tuple. For example, each flow may be identified by a 5-tuple that includes a unique combination of a source (e.g., client) IP address, source port number, destination (e.g., server) IP address, destination port number, and protocol. In other embodiments, a flow may be identified by any suitable one or more parameters of a packet (e.g., which may be included in a header of the packet or in a payload portion of the packet). Such parameters may include, e.g., one or more source addresses (e.g., IP address, media access control (MAC) address, or other address), one or more destination addresses (e.g., IP address, MAC address, or other address), one or more protocol identifiers (e.g., User Datagram Protocol (UDP), Transmission Control Protocol (TCP), IPv4, IPv6, or other protocol), one or more ports (e.g., Open Systems Interconnection (OSI) model layer 4 source and/or destination ports) associated with the packet, a Virtual Local Area Network (VLAN) identifier, a Virtual eXtensible Local Area Network (VXLAN) Network Identifier, one or more priorities of the packet (e.g., a quality of service (QoS) value) identifying a class of the traffic, or other suitable parameters of the packet.

The analytics engine 110 may determine analytics for various flows that have packets within the incoming packet buffer 106. During an analytics instance, analytics engine 110 may analyze all of the packets that are stored in the incoming packet buffer (or a subset thereof) and determine analytics information for each burst of packets of each flow (e.g., the packets of each flow that are within the packets being analyzed during the analytics instance). In some embodiments, in order to improve the steering decisions, the analytics engine may wait until a flow has a minimum number (e.g., 64 or other suitable number) of packets available for analysis before performing analytics for the flow.

The analytics engine may determine any suitable packet flow characteristics for the analyzed packets in generating the per-flow analytics information. For example, such flow characteristics may include a per-flow size metric such as an average packet size of the flow, a standard deviation of the packet sizes of the flow, a measure of the number or rate of packets over a particular size, or other size metric. The flow characteristics may alternatively or additionally include other per-flow metrics, such as packet rate, packet types (e.g., as indicated by a class of the packets), weighting of packet types (e.g., an indication of the relative percentage of packets of the flow that are of a particular packet type), or other suitable packet flow characteristics.

In some embodiments, the analytics engine assigns a score to each flow based on one or more flow characteristics as indicated by the generated analytics information. For example, a flow may be assigned a score between 1 and 10 (or in some other range). The scores may have any suitable granularity. In one example, the score assigned to a packet flow is inversely proportional to the packet sizes of the packet flow. Thus, flows with analytics information indicating larger packet sizes may be assigned lower scores while flows with analytics indicating smaller packet sizes may be assigned higher scores. For example, a flow of 64 B packets with a rate of 10 Gbps may be assigned a score of 10 while a flow of 1500 B packets with the same rate may be assigned a score of 1 or 2. In various embodiments, any suitable scoring mechanism based on any one or more of the packet flow characteristics described herein or other suitable packet flow characteristics is contemplated herein.

Each flow may be steered by the analytics engine 110 to a NIC packet queue 108 (e.g., low priority queue 114, high priority queue 116, or an additional queue 118) based on the per-flow analytics information. In various embodiments, the steering decisions may be based on the raw packet flow characteristics or information derived therefrom (such as the above-mentioned scores).

In some embodiments, NIC 102 may comprise any suitable arrangement of packet queues 108. In the embodiment depicted, NIC 102 comprises a low priority queue 114, a high priority queue 116, and additional queues 118 (e.g., where the additional queues 118 may include one or more queues having one or more intermediate priorities). In some examples, NIC 102 may comprise a plurality of low priority queues 114, a plurality of high priority queues 116, a plurality of queues each having a first intermediate priority, a plurality of queues each having a second intermediate priority, etc. When multiple queues of the same priority are present, flows that are assigned to that priority may be distributed among the multiple queues by any suitable methods. For example, the flows could be distributed among the queues in a round robin fashion or by using a hash of packet flow header fields to generate an index which is then mapped to one of the queues.

In some embodiments, thresholds (e.g., score thresholds or thresholds for particular packet flow characteristics) may be associated with the packet queues 108 and the flows may be assigned to the packet queues based on these thresholds. This may allow a dedicated core 120 to handle problematic or process intensive flows which will be placed into an appropriate queue (e.g., high priority queue 116) assigned to the core. For example, flows assigned a score equal to or higher than a particular threshold (e.g., 9) may be assigned to the high priority queue 116 while flows having scores lower than the threshold may be assigned to the low priority queue 114 (e.g., when no additional queues 118 are present). In another example, multiple score thresholds may be used. For example, flows assigned a score of 10 may be assigned to the high priority queue 116, flows assigned to a score between 6 and 9 may be assigned to an intermediate priority queue (of the additional queues 118), and flows assigned to a score of less than 6 may be assigned to the low priority queue 114. In various embodiments, any number of intermediate priority queues (of additional queues 118) that have varying levels of priority in between the lower priority of the low priority queue 114 and the higher priority of the high priority queue 116 may be used (and each may be associated with a range of one or more scores or other thresholds).

In various embodiments a worst case flow analytics score methodology may be used to assign flows to packet queues 108, which may improve utilization of the high priority queue 116 and the core servicing it relative to using a threshold score which is met by very few cores. As one example of such a methodology, the highest scoring N flows (where N is any suitable integer) from each analytics instance may be assigned to the high priority queue 116 and the remainder of the flows from the analytics instance may be assigned to the low priority queue 114. As another example, the highest scoring N flows may be assigned to the high priority queue 116, the next highest scoring M flows (where M is any suitable integer) may be assigned to an intermediate priority queue, and the remainder of the queues may be assigned to the low priority queue 114, and so on.

The analytics engine 110 may maintain a flow steering table 112 to be used to steer packets to the proper packet queues. The flow steering table 112 may be embodied in any suitable type of memory. Entries of the flow steering table 112 may each correspond to a flow. An entry may include flow data that identifies the flow. For example, the flow data may include flow parameters (such as any of the parameters described above such as addresses, protocols, ports, etc.) or one or more values (e.g., a hash) based thereon. An entry may also include an identifier that indicates which packet queue 108 the flow is assigned to. In some embodiments, an entry also includes analytics information, such as the score determined for the flow. In various embodiments, an entry also includes a time-to-live (TTL) parameter indicative of the amount of time elapsed since a packet was last received for the flow. Because flow steering table 112 has a finite size, a TTL of each table entry may be used to identify flows for which no packets have been received for a predetermined amount of time. When the predetermined amount of time has elapsed, the table entry may be overwritten with an entry for a new flow.

The flow steering table 112 may be used to maintain affinity between the packet flows and their assigned packet queues. Since the average packet size, rate, or other characteristic of a flow can change mid-flow, the analytics for the flow on which the queue steering decision is based could also change. In various embodiments, in order to prevent packet re-ordering issues, the entries in the flow steering table 112 may prevent packets from the same flow from being steered to different packet queues. Thus, in certain embodiments, once a flow is assigned to a packet queue 108 by writing an entry into the flow steering table 112, the flow remains on that queue.

In some embodiments, prior to performing analytics on a flow during an analytics instance, the analytics engine 110 may perform a lookup into the flow steering table 112 to determine whether an identified flow is already assigned to a packet queue 108. If an entry already exists, the packets of the flow may be directed to the previously assigned packet queue 108 and performance of the analytics on the flow may be omitted. If an entry for the flow is not found in the flow steering table 112 and room in the flow steering table 112 is available, the analytics are performed, a packet queue is chosen based on the analytics information, and an entry for the flow is added to the flow steering table 112.

In an embodiment, if a new flow is received but the flow steering table 112 is full and no entries have reached the limit of their TTL, the packet flow is steered to the low priority queue 114 by default. In some embodiments, when the flow steering table 112 is full and no entries have reached the limit of their TTL, the analytics engine 110 may cease performing analytics on incoming packets until one or more entries in the flow steering table 112 are available. In some instances, an entry of flow steering table 112 may become available after packets of a flow have been steered to the low priority queue 114. The analytics engine 110 may then (e.g., in a later analytics instance) determine that the packet flow should be steered to the high priority queue 116 (or an intermediate priority queue of additional queues 118 having a priority higher than the low priority queue). If the flow is steered to a different queue (e.g., the high priority queue 116) before the packets of the flow that were previously sent to the low priority queue 114 have been dequeued (e.g., retrieved by the host computing system 102), a packet re-ordering problem may arise (e.g., the packets could be processed out of order by the respective cores polling (or otherwise assigned to process packets of, e.g., via interrupts) the low priority queue 114 and the high priority queue 116). In some embodiments, the NIC 104 may tag the packets with a timestamp, sequence number, or the like so that the ordering of the packets may be perceived by software of the host computing system 102. In various embodiments, all packets that are steered to the packet queues 108 may be tagged with the timestamp, sequence number, etc. In other embodiments, only the packets of flows that are split between different packet queues are tagged (e.g., the analytics engine 110 may detect through analytics that a flow is a high priority flow but is temporarily sent to a default queue (e.g., low priority queue 114) until an entry in the flow steering table 112 becomes available and may cause packets of such a flow to be tagged).

In some embodiments, NIC 104 may mark certain flows so that the analytics engine 110 does not perform analytics on such flows. For example, circuitry (e.g., a flow director of the NIC 104) prior to the analytics engine 110 in the packet flow through NIC 104 may perform such marking. Such flows may, e.g., be steered to packet queues 108 based on packet characteristics (e.g., flow parameters parsed from the packet header or body or derivations thereof) rather than flow analytics. In some embodiments, a particular flow may completely bypass the analytics engine 110 (in that the analytics engine 110 never assigns the flow to a packet queue 108). In various embodiments, the analytics engine 110 could provide feedback based on analytics information or a state of the flow steering table 112 (e.g., when the table 112 is full) to the circuitry to allow the circuitry to mark the flows that should skip analytics and to direct the flows to packet queues 108 (or other packet queues).

In some embodiments, NIC 104 may include a programmable pipeline (which in some embodiments may implement all or a portion of analytics engine 110) to process packets and steer the packets into their respective queues (or perform other actions with respect to the packets). The programmable pipeline may be customizable based on a programming language that controls packet forwarding planes in networking devices. The programmable pipeline may process packets in a manner defined by the current programmed configuration (which could be changed at any suitable time to fit the needs of the application). For example, any one or more of the header parsing logic, header names and field lengths, and match-action rules may be programmable.

Figure 2:
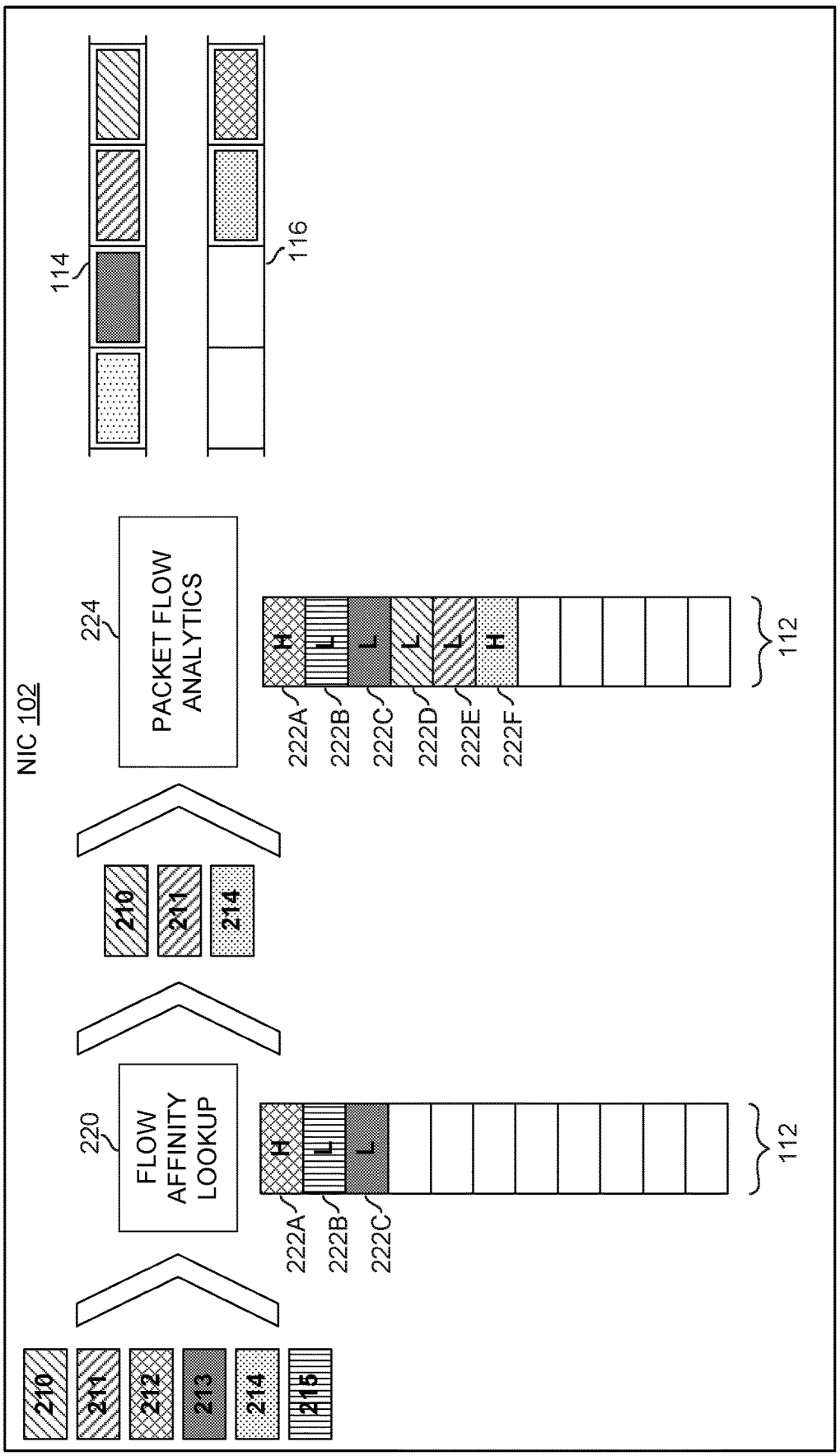
FIG. 2 illustrates a flow for steering packets onto queues based on flow analytics in accordance with certain embodiments.

FIG. 2 illustrates a flow 200 for steering packets onto packet queues 108 based on per-flow analytics information in accordance with certain embodiments. In flow 200, NIC 102 receives a variety of packet flows 210-215, which may each represent a plurality of related packets. In this example, packet flows 210-215 represent the flows with packets included in an analysis instance of the analytics engine 110 (e.g., these flows may each have packets in the incoming packet buffer 106 at a first instance in time). The analytics engine 110 may perform a flow affinity lookup 220 for each of the flows. A flow affinity lookup 220 may include searching the flow steering table 112 to determine whether the table has an entry for the flow. In the embodiment depicted, at a first instance of time prior to the flow affinity lookups, the flow steering table 112 includes an entry 222A for flow 212, an entry 222B for flow 215, and an entry 222C for flow 213. Such entries may have been written to the flow steering table during one or more previous analytics instances. The high priority (H) and low priority (L) designations represent the packet queue assignment for the respective flows, where flows marked with an H have been assigned to high priority queue 116 and flows marked L have been assigned to low priority queue 114.

The flow affinity lookups 220 will show that flows 212, 215, and 213 already have entries in the flow steering table 112 and thus analytics are not performed on the packets of these flows. In some embodiments, the analytics engine 110 or other circuitry of the NIC 102 will reset the TTL values in these entries responsive to detecting that packets from these flows have been received. However, flows 210, 211, and 214 do not have corresponding entries in the flow steering table 112. Thus, analytics engine 110 performs packet flow analytics 224 on the packets of these flows. Based on the analytics performed, the analytics engine 110 assigns a packet queue to each flow and stores an entry for each flow in the flow steering table 112. In the example depicted, entry 222D is stored for flow 210, entry 222E is stored for flow 211, and entry 222F is stored for flow 214.

The packets of the various flows are steered by the NIC 102 to the packet queues 108 based on their assignments per the flow steering table 112. In the embodiment depicted, packets from flows 212 and 214 are steered to the high priority queue 116 while the packets from the remaining flows are steered onto the low priority queue 114.

As described above, the packet queues may be assigned to cores 120 of the host computing system 102 based on the priority of the packet queues. For example, host computing system 102 (e.g., through kernel 124) may bind a core (e.g., 120A) that is operating at a relatively high frequency to a high priority queue 116 and a core (e.g., 120B) that is operating at a relatively low frequency to a low priority queue 114. As another example, cores operating at intermediate frequencies may be bound to additional queues 118.

In various embodiments, a core 120 may be assigned to poll a single packet queue 118 or any number of packet queues of NIC 104. In various embodiments, multiples cores 120 may each poll one or more respective packet queues of NIC 104. A core 120 that polls a packet queue may also be assigned to process the packets of that queue or a first core 120 may poll a queue on behalf of a second core 120 that eventually processes the packets of that queue after the packets have been transferred to the host computing system 102.

When a core 120 polls a NIC packet queue 108, the core 120 may communicate with the NIC 102 to determine whether packets are available on the packet queue 108 for transfer to the host computing system 102 to be processed. In an embodiment, the assigned core 120 may check a doorbell queue associated with the packet queue 108, where an entry in the doorbell queue may include information identifying packets in the packet queue that are available for transfer to the host computing system 102. In some embodiments, the doorbell queue may be implemented as a ring buffer. In the embodiment depicted, a core 120 may utilize a user space poll mode driver (PMD) 128 (e.g., a Data Plane Development Kit (DPDK) poll mode driver when the host computing system implements the DPDK, which is available at http://git.dpdk.org/dpdk/) to poll the packet queue bound to the core 120. For example, core 120A may utilize user space PMD 128A to poll high priority queue 116 and core 120B may utilize user space PMD 128B to poll low priority queue 114, and so on. In some embodiments, the packets may be processed by a linux kernel network stack using an interrupt notification method including processing by the linux network work stack in conjunction with user space processing utilizing eBPF (e.g., as described in https://ebpfio/ or https://docs.projectcalico.org/about/about-ebpf), where some processing takes place in the packet filter before passing the packet to the user space for further processing.

When a doorbell is detected by the polling core 120, the packets that are available in the corresponding packet queue 108 may be transferred, e.g., via direct memory access, into memory 122 (e.g., L3 cache or other suitable memory) of the host computing system 102 where they are available for processing by the assigned core (e.g., the packets may be placed into user space by the user space PMD 128), which may be the polling core 120 or a different core 120. In various embodiments, the memory 122 may be shared across any number of cores 120. In some embodiments, once the packets are in memory 322, they may be processed by respective threads 126 (e.g., 126A, B, . . . N) executed by the cores 120 assigned to the packet queues.

In some embodiments, the packets may be made available to the cores that process the packets (e.g., by implementing a network stack) using interrupts, rather than polling mechanisms. In such embodiments, the packet flow analytics may still be used to place packets in queues according to priority so that a higher priority queue may have its packets processed by a core that is operating at a higher frequency than a core that is processing packets of a lower priority queue. The core processing packets of a particular queue could also be adjusted by the host computing system 102 based on the packet flow analytics (e.g., as described below). In some embodiments, host computing system 102 may implement a version of Open Data Plane (ODP) (e.g., as available at https://opendataplane.org/), which may allow implementation of an event-driven model (e.g., interrupts) or a polling mode driver.

In some embodiments, the NIC 102 may implement Application Device Queueing (ADQ) which refers to a computing technique in which one or more queues of a network interface controller are dedicated to a particular execution thread (e.g., of an application or virtualized execution environment (VEE) such as a bare-metal function, container, or virtual machine). These queues can be exclusively accessed by the respective execution threads. ADQ may prevent network traffic contention caused by different applications or VEEs attempting to access the same queue.

ADQ may also provide quality of service (QoS) control for dedicated application traffic queues for received packets or packets to be transmitted.

In some embodiments, control plane traffic may be placed in one or more particular priority queues while data plane traffic may be placed in one or more other priority queues, such that the control plane traffic may be processed (polled or otherwise processed) by a core running at a frequency that is different from a frequency of a core that processes the data plane traffic.

Figure 3:
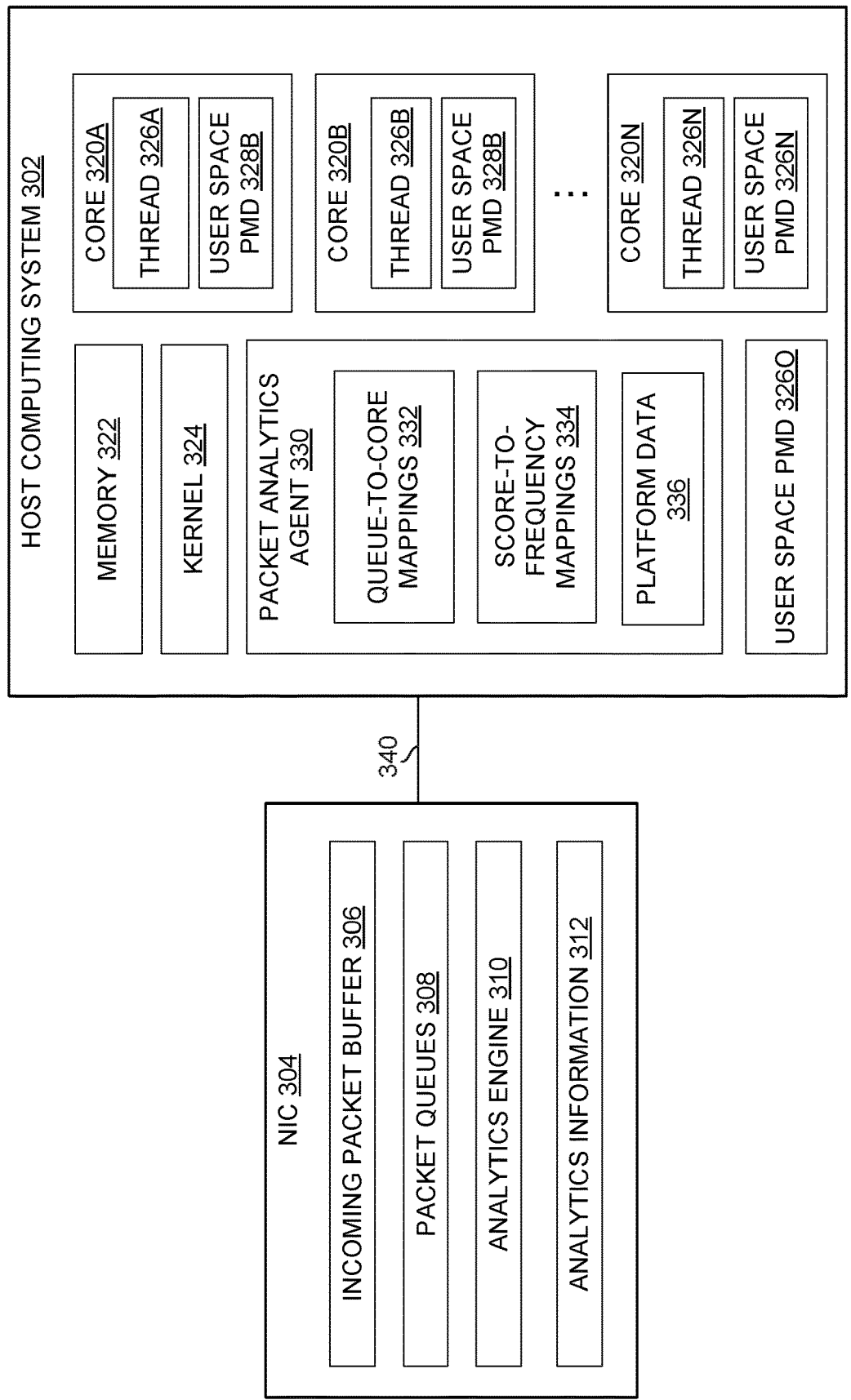
FIG. 3 illustrates a system for core frequency tuning based on packet flow analytics in accordance with certain embodiments.

FIG. 3 illustrates a system 300 for core frequency tuning based on per-flow analytics information in accordance with certain embodiments. System 300 includes a NIC 304 and host computing system 302 coupled via link 340. In the embodiment depicted, NIC 304 includes incoming packet buffer 306, packet queues 308, and analytics engine 310 which may have any combination of features described above for similar components of FIG. 1. NIC 304 also includes analytics information 312 stored in any suitable memory. Analytics information 312 may include any of the analytics information described herein (e.g., as recited above). Host computing system 302 includes a plurality of cores 320 (e.g., 320A-320N), memory 322, and kernel 324, which also may have any combination of features described above for similar components of FIG. 1. Host computing system 302 also includes packet analytics agent 330. Packet analytics agent 330 maintains queue-to-core mappings 332, score-to-frequency mappings 334, and platform data 336.

The packet analytics agent 330 may run on the host computing system 302. For example, a processor unit of the host computing system 302 may execute or otherwise implement the packet analytics agent 330. The packet analytics agent 330 may access the analytics information 312 provided by analytics engine 310 of the NIC and take action based on the information. In one embodiment, the packet analytics agent 330 may utilize poll mode driver 3260 to access the analytics information 312 (e.g., the analytics information 312 may be stored in a buffer accessible by the poll mode driver), although other embodiments may utilize any suitable methods to provide the analytics information 312 to the packet analytics agent 330.

In some embodiments, per-flow analytics information 312 generated by the analytics engine 310 may be communicated, e.g., over a management channel of the link 340, to the packet analytics agent 330 of the host computing system 102 to allow the packet analytics agent 330 to cause the host computing system 302 to adapt to the incoming packet flows, e.g., by changing a frequency of one or more of the cores 320 polling the packet queues 308. In some embodiments, the packet analytics agent 330 may direct the kernel 324 to implement a change in frequency of a particular core 320.

Any suitable flow analytics information collected by the analytics engine 310 (such as any of the analytics described above or other suitable analytics information) may be communicated by the NIC 304 to the host computing system 302. In various embodiments, any one or more of flow identification information (such as any of the flow parameters described above or information derived therefrom), a port of the flow, and a packet queue 308 to which the flow is directed may be provided by the NIC 304 along with analytics information for the flow to the packet analytics agent 330. In various embodiments, performance of the analytics or communication of the packet analytics information to the host computing system 102 may be configurable to be enabled or disabled on a packet queue by packet queue basis for one or more of the packet queues 108.

In one example, analytics scores or flow characteristics that are over a configurable threshold may be communicated to the host computing system 102 to allow the host computing system 102 to adjust to high priority flows. For example, all flows that have scores that are over 8 may be reported to the host computing system 102. As another example, all flows that have an average packet size of 64 B or smaller may be reported to the host computing system 102.

The queue-to-core mappings 332 may track the assignments of packet queues 308 to the cores 320 that poll those packet queues. For example, an entry in the queue-to-core mappings 332 may specify a particular core 320 as well as a device ID corresponding to a particular packet queue 308.

FIG. 4 illustrates an example instance of score-to-frequency mappings 334 in accordance with certain embodiments. The score-to-frequency mappings 334 each map an analytics score to a core operational frequency to provide guidance for dynamically varying the operational frequencies responsive to the analytics information. In the embodiment depicted, a default core frequency of 2.2 GHz is assumed. In various embodiments, a core 320 polling a packet queue 308 may normally operate at the default frequency but may be changed to a different frequency when the packet analytics agent 330 is notified that a flow having a score mapped to a higher frequency in mappings 334 has been directed to the packet queue 308 being polled by the core 320.

In the embodiment depicted, the score-to-frequency mappings 334 includes entries for each score that is 5 or above (although other embodiments may map different ranges of scores or other packet flow characteristics to operating frequencies). In the embodiment depicted, the entries of score-to-frequency mappings 334 each include a core frequency and a maximum duration mapped to a score. When a polling core is increased to the core frequency indicated in the score-to-frequency mappings 334, a timer for the maximum duration may be started to limit the duration of time that the polling core remains at this higher frequency. In an embodiment, once the timer has expired, the polling core may revert to the standard frequency. In various embodiments, the mappings 334 may include entries in which the maximum duration rises as the frequency decreases (e.g., a polling core may remain at a turbo frequency for only a short period, whereas the polling core may remain at a lower frequency for a longer period of time). In some embodiments, this may operate to prevent the host computing system 302 from exceeding a power budget while maintaining desired core frequencies (as some host computing systems are configured to throttle core speeds when a thermal condition is exceeded).

Packet analytics agent 330 also stores (or is otherwise able to access) platform data 336. Platform data may indicate the state of various components or groups of components of system 300. Examples of such platform data include identifications of the cores 320, the available frequency ranges of the cores 320, current frequency settings of the cores 320, timer values when a core has been set to a frequency different than the default frequency, power settings for the host computing system 302, available packet queues, and assignments of cores to the packet queues. Any other suitable data may be included within the platform data 336.

In various embodiments, the packet analytics agent 330 may take any suitable platform data (e.g., the state of one or more other cores) into account before adjusting the frequency of a particular polling core. For example, if there are a number of cores already running at a high frequency, then the packet analytics agent may determine not to increase the frequency of another core even if the score-to-frequency mappings 334 recommends a particular frequency for that core based on the score of a flow being directed to a packet queue being polled by that core. Thus, in some embodiments, the analytics information provided by the NIC 304 may function as a hint, rather than a direct instruction to adjust the frequency of a core.

Host computing system 102 may change the frequency of one or more cores in any suitable manner. In some embodiments, the system 102 may directly change the frequency of a core or indirectly change the frequency of the core (e.g., by changing the power budget for the core or a component thereof, thus the system 102 could change the power budget for a core responsive to flow analytics).

Figure 5:
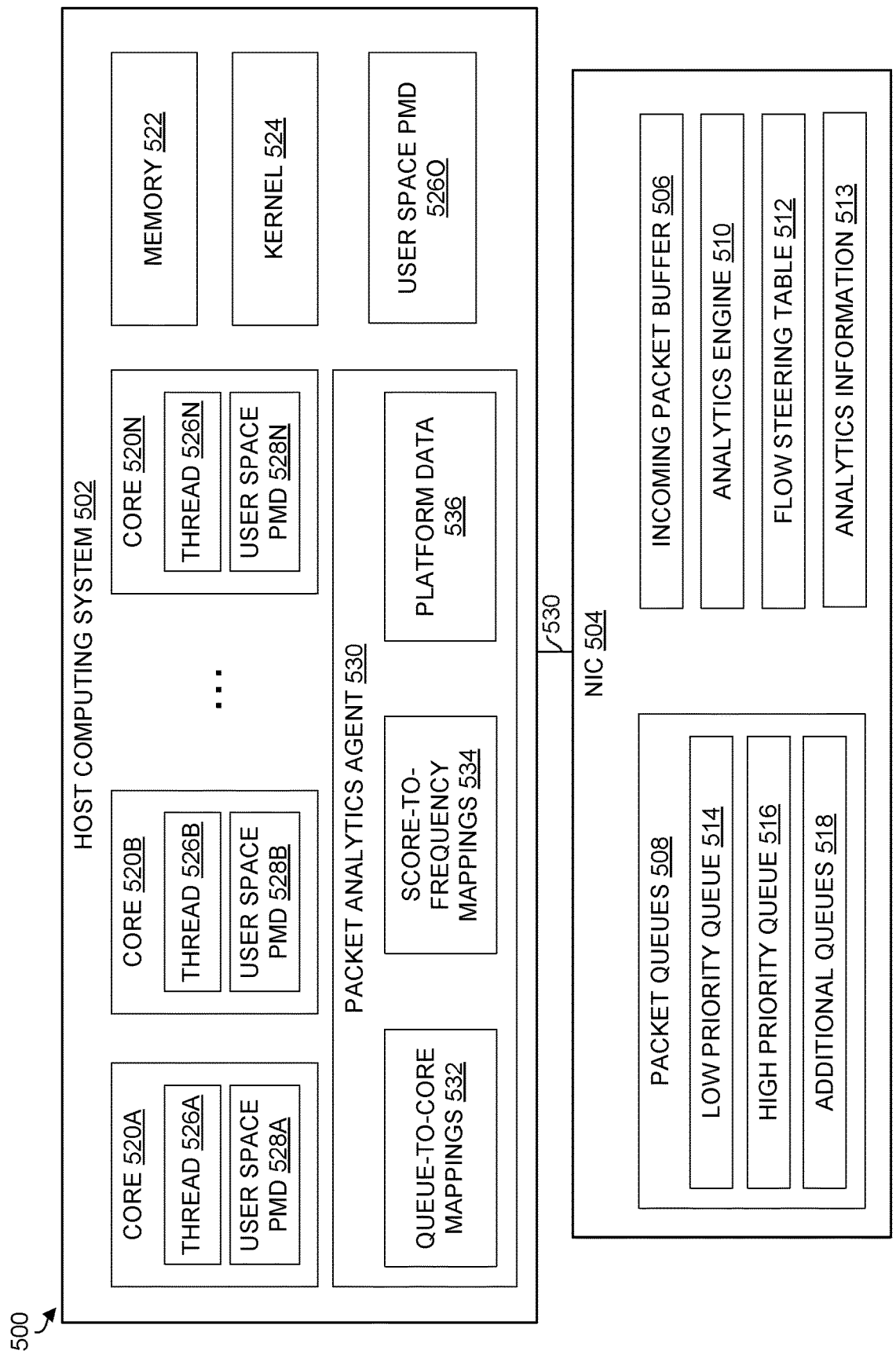
FIG. 5 illustrates a system for NIC priority queue steering and core frequency tuning based on packet flow analytics in accordance with certain embodiments.

FIG. 5 illustrates a system 500 for NIC priority queue steering and core frequency tuning based on packet flow analytics information in accordance with certain embodiments. System 500 includes a NIC 504 and host computing system 502 coupled via link 530. In the embodiment depicted, NIC 504 includes incoming packet buffer 506, packet queues 508, analytics engine 510, flow steering table 512, and analytics information 513 which may have any combination of features described above for similar components of FIG. 1 or FIG. 3. Host computing system 502 includes a plurality of cores 520 (e.g., 520A-520N), memory 522, kernel 524, packet analytics agent 530, and user space PMD 5260 which also may have any combination of features described above for similar components of FIG. 1 or FIG. 3.

System 500 may be capable of providing any combination of functionalities described above. Analytics engine 510 may steer incoming packet flows to packet queue 508 based on analytics information. NIC 504 may also provide analytics information 513 to the host computing system 502 to allow the host computing system 502 to make intelligent decisions on assigning polling cores 520 to packet queues 508 and to dynamically vary the operational frequencies of the cores.

As just one illustration, a flow which was steered by the analytics engine 510 to the low priority queue 514 may receive a burst of small packets. These small packets could be detected by the analytics engine 510 on the NIC 504 and a "hint" is sent to the host computing system 502 to encourage the host computing system 502 to increase the frequency of the core that is polling the low priority queue 514 for a period of time.

Figure 6:
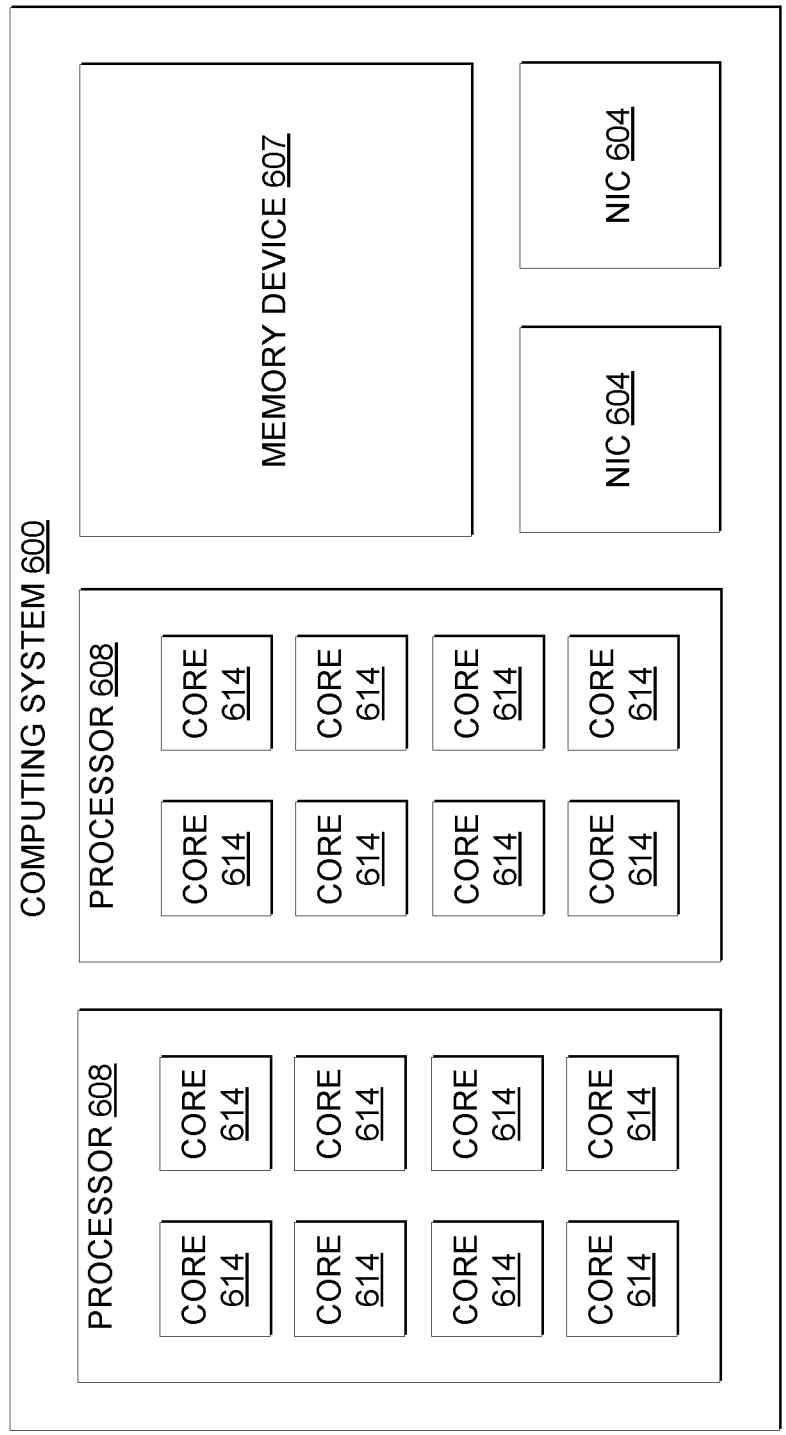
FIG. 6 illustrates a computing system in accordance with certain embodiments.

FIG. 6 illustrates a computing system 600 in accordance with certain embodiments. The computing system (or other suitable computing system) may be used to implement any of the systems described herein (e.g., computing system 100, 300, 500). Computing system comprises multiple processors 608 (although other implementations may include a single processor). The processor may be a microprocessor, an embedded processor, a digital signal processor (DSP), a network processor, a handheld processor, an application processor, a co-processor, an SOC, or other device to execute code (i.e., software instructions). Processor 608, in the depicted embodiment, includes eight processing elements (e.g., cores 614), which may include asymmetric processing elements or symmetric processing elements. However, a processor may include any number of processing elements that may be symmetric or asymmetric. In other embodiments, processor 608 may include one or more processor units.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 614 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

Memory device 607 may store any suitable data, such as data used by processor 608 to provide the functionality of computing system 600. For example, data associated with programs that are executed or files accessed by cores 614 may be stored in memory device 607. Thus, a memory device 607 may include a system memory that stores data and/or sequences of instructions that are executed or otherwise used by the cores 614. In various embodiments, a memory device 607 may store temporary data, persistent data (e.g., a user's files or instruction sequences) that remains stored even after power to the system memory device 607 is removed, or a combination thereof. A memory device 607 may be dedicated to a particular processor 608 or shared with other devices (e.g., one or more other processors or other devices) of computing system 600.

In various embodiments, a memory device 607 may include a memory comprising any number of memory arrays, a memory device controller, and other supporting logic (not shown). A memory array may include non-volatile memory and/or volatile memory. Non-volatile memory is a storage medium that does not require power to maintain the state of data stored by the medium, thus non-volatile memory may have a determinate state even if power is interrupted to the device. Nonlimiting examples of nonvolatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bitlines and are individually addressable and in which bit storage is based on a change in bulk resistance.

Volatile memory is a storage medium that requires power to maintain the state of data stored by the medium (thus volatile memory is memory whose state (and therefore the data stored on it) is indeterminate if power is interrupted to the device). Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications.

Any of the memories described above with respect to memory device 607 may be used to implement any of the other memories described herein.

NICs 604 may be used to send and receive network traffic such as data packets. NICs may also be known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC 604 may enable communication between any suitable element of computing system 600 and another device coupled to the computing system 600 through a network. In various embodiments a NIC 604 may be integrated with a chipset of the computing system 600 (e.g., may be on the same integrated circuit or circuit board as the rest of the chipset logic) or may be on a different integrated circuit or circuit board that is electromechanically coupled to the chipset. In various embodiments, a NIC may include a communication interface, processing logic, memory, or other suitable components to facilitate its operations.

The flows described in the FIGURES herein are merely representative of operations that may occur in particular embodiments. In other embodiments, additional operations may be performed by the components of the various systems described herein. Various embodiments of the present disclosure contemplate any suitable signaling mechanisms for accomplishing the functions described herein. Some of the operations illustrated in the FIGURES may be repeated, combined, modified or deleted where appropriate. Additionally, operations may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disk may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein or as depicted in the FIGURES refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various systems or components (e.g., analytics engines 110, 310, 510, packet analytics agents 330, 530) described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, e.g., reset, while an updated value potentially includes a low logical value, e.g., set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EE- PROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example 1 includes a system comprising a network interface controller comprising circuitry to determine per-flow analytics information for a plurality of packet flows; and facilitate differential rate processing of a plurality of packet queues for the plurality of packet flows based on the per-flow analytics information.

Example 2 includes the subject matter of Example 1, and wherein the per-flow analytics information comprises per-flow size metrics for the plurality of packet flows.

Example 3 includes the subject matter of Example 2, and wherein the per-flow size metrics comprise an average packet size of a packet flow.

Example 4 includes the subject matter of any of Examples 1-3, and wherein the differential rate processing comprises polling of the plurality of packet queues by a plurality of processor units set to operate at different frequencies.

Example 5 includes the subject matter of any of Examples 1-4, and wherein the differential rate processing comprises changing a frequency of a processor unit polling a packet queue of the plurality of packet queues.

Example 6 includes the subject matter of any of Examples 1-5, and wherein facilitating differential rate processing comprises steering the plurality of packet flows to the plurality of packet queues based on the per-flow analytics information.

Example 7 includes the subject matter of any of Examples 1-6, and wherein facilitating differential rate processing comprises providing at least a portion of the per-flow analytics information to a host computing system for use in a determination of whether to adjust an operating frequency of a processor unit polling a packet queue of the plurality of packet queues.

Example 8 includes the subject matter of any of Examples 1-7, and wherein facilitating differential rate processing comprises assigning a packet flow to a default packet queue based on per-flow analytics information for the packet flow and subsequently providing a portion of the per-flow analytics information to a host computing system responsive to a burst of packets of the packet flow for use in determination of whether to raise an operating frequency of a processor unit polling the default packet queue.

Example 9 includes a method comprising determining per-flow analytics information for a plurality of packet flows received by a network interface controller; and facilitating differential rate processing of a plurality of packet queues for the plurality of packet flows based on the per-flow analytics information.

Example 10 includes the subject matter of Example 9, and wherein the per-flow analytics information comprises per-flow size metrics for the plurality of packet flows.

Example 11 includes the subject matter of Example 10, and wherein the per-flow size metrics comprise an average packet size of a packet flow.

Example 12 includes the subject matter of any of Examples 9-11, and wherein the differential rate processing comprises polling of a plurality of packet queues by a plurality of processor units set to operate at different frequencies.

Example 13 includes the subject matter of any of Examples 9-12, and wherein the differential rate processing comprises changing a frequency of a processor unit polling a packet queue of the plurality of packet queues.

Example 14 includes the subject matter of any of Examples 9-13, and wherein facilitating differential rate processing comprises steering the plurality of packet flows to the plurality of packet queues based on the per-flow analytics information.

Example 15 includes the subject matter of any of Examples 9-14, and wherein facilitating differential rate processing comprises providing at least a portion of the per-flow analytics information to a host computing system for use in a determination of whether to adjust an operating frequency of a processor unit polling a packet queue of the plurality of packet queues.

Example 16 includes the subject matter of any of Examples 9-15, and wherein facilitating differential rate processing comprises assigning a packet flow to a default packet queue based on per-flow analytics information for the packet flow and subsequently providing a portion of the per-flow analytics information to a host computing system responsive to a burst of packets of the packet flow for use in determination of whether to raise an operating frequency of a processor unit polling the default packet queue.

Example 17 includes a system comprising means for determining per-flow analytics information for a plurality of packet flows received by a network interface controller; and means for facilitating differential rate processing of a plurality of packet queues for the plurality of packet flows based on the per-flow analytics information.

Example 18 includes the subject matter of Example 17, and wherein the per-flow analytics information comprises per-flow size metrics for the plurality of packet flows.

Example 19 includes the subject matter of Example 18, and wherein the per-flow size metrics comprise an average packet size of a packet flow.

Example 20 includes the subject matter of any of Examples 17-19, and wherein the differential rate processing comprises polling of a plurality of packet queues by a plurality of processor units set to operate at different frequencies.

Example 21 includes the subject matter of any of Examples 17-20, and wherein the differential rate processing comprises changing a frequency of a processor unit polling a packet queue of the plurality of packet queues.

Example 22 includes the subject matter of any of Examples 17-21, and wherein facilitating differential rate processing comprises steering the plurality of packet flows to the plurality of packet queues based on the per-flow analytics information.

Example 23 includes the subject matter of any of Examples 17-22, and wherein facilitating differential rate processing comprises providing at least a portion of the per-flow analytics information to a host computing system for use in a determination of whether to adjust an operating frequency of a processor unit polling a packet queue of the plurality of packet queues.

Example 24 includes the subject matter of any of Examples 17-23, and wherein facilitating differential rate processing comprises assigning a packet flow to a default packet queue based on per-flow analytics information for the packet flow and subsequently providing a portion of the per-flow analytics information to a host computing system responsive to a burst of packets of the packet flow for use in determination of whether to raise an operating frequency of a processor unit polling the default packet queue.

Example 25 includes a system comprising a plurality of processor units to poll a plurality of packet queues of a network interface controller; and circuitry to implement differential rate processing of a plurality of packet queues by the plurality of processor units based on per-flow analytics information generated by the network interface controller.

Example 26 includes the subject matter of Example 25, the circuitry to implement differential rate processing of the plurality of packet queues by assigning processor units operating at different frequencies to poll the plurality of packet queues.

Example 27 includes the subject matter of any of Examples 25 and 26, the circuitry to implement differential rate processing of the plurality of packet queues by dynamically varying a frequency of a processor unit of the plurality of processor units based on at least a portion of the per-flow analytics information generated by the network interface controller.

Example 28 includes the subject matter of Example 27, and wherein the circuitry is to set a timer in association with a change in the frequency of the processor unit and to cause the processor unit to revert back to a default frequency upon expiration of the timer.

Example 29 includes the subject matter of Example 27, and wherein the circuitry is to dynamically vary the frequency of the processor unit of the plurality of processor units further based on platform data of a host computing system comprising the processor units.

Example 30 includes the subject matter of Example 29, and wherein the platform data comprises a power budget for at least a portion of the host computing system.

Example 31 includes the subject matter of any of Examples 25-30, and wherein the per-flow analytics information generated by the network interface controller comprises an analytics score for a packet flow.

Example 32 includes one or more non-transitory computer-readable media with code stored thereon, wherein the code is executable to cause a machine to implement differential rate processing, by a plurality of processor units, of a plurality of packet queues of a network interface controller based on per-flow analytics information generated by the network interface controller.

Example 33 includes the subject matter of Example 32, and wherein the code is to cause the machine to implement differential rate processing of the plurality of packet queues by assigning processor units operating at different frequencies to poll the plurality of packet queues.

Example 34 includes the subject matter of any of Examples 32-33, and wherein the code is to cause the machine to implement differential rate processing of the plurality of packet queues by dynamically varying a frequency of a processor unit of the plurality of processor units based on at least a portion of the per-flow analytics information generated by the network interface controller.

Example 35 includes the subject matter of Example 34, and wherein the code is to cause the machine to set a timer in association with a change in the frequency of the processor unit and to cause the processor unit to revert back to a default frequency upon expiration of the timer.

Example 36 includes the subject matter of Example 34, wherein the code is to cause the machine to dynamically vary the frequency of the processor unit of the plurality of processor units further based on platform data of a host computing system comprising the plurality of processor units.

Example 37 includes a method to implement differential rate processing, by a plurality of processor units, of a plurality of packet queues of a network interface controller based on per-flow analytics information generated by the network interface controller.

Example 38 includes the subject matter of Example 37, and wherein implementing differential rate processing of the plurality of packet queues comprises assigning processor units operating at different frequencies to poll the plurality of packet queues.

Example 39 includes the subject matter of any of Examples 37-38, and wherein implementing differential rate processing of the plurality of packet queues comprises dynamically varying a frequency of a processor unit of the plurality of processor units based on at least a portion of the per-flow analytics information generated by the network interface controller.

Example 40 includes the subject matter of Example 39, and further comprising setting a timer in association with a change in the frequency of the processor unit and to cause the processor unit to revert back to a default frequency upon expiration of the timer.

Example 41 includes the subject matter of Example 39, further comprising dynamically vary the frequency of the processor unit of the plurality of processor units further based on platform data of a host computing system comprising the plurality of processor units.

Example 42 includes a system comprising one or more means to perform the operations of any of Examples 37-41.

What is claimed is:
1. A system comprising:
a network interface controller comprising circuitry to:
determine per-flow analytics information for a plurality of packet flows that are received at the network interface controller and provided from the network interface controller to a plurality of processor units; and
facilitate differential rate processing by the plurality of processor units of a plurality of packet queues for the plurality of packet flows based on the per-flow analytics information, wherein a first packet flow of the plurality of packet flows is assigned to a first packet queue of the plurality of packet queues based upon sizes of packets of the first packet flow.

2. The system of claim 1, wherein the per-flow analytics information comprises per-flow size metrics for the plurality of packet flows.

3. The system of claim 2, wherein the per-flow size metrics comprise an average packet size of a packet flow.

4. The system of claim 1, wherein the differential rate processing comprises polling of the plurality of packet queues by a plurality of processor units set to operate at different frequencies.

5. The system of claim 1, wherein the differential rate processing comprises changing a frequency of a processor unit polling a packet queue of the plurality of packet queues.

6. The system of claim 1, wherein facilitating differential rate processing comprises steering the plurality of packet flows to the plurality of packet queues based on the per-flow analytics information.

7. The system of claim 1, wherein facilitating differential rate processing comprises providing at least a portion of the per-flow analytics information to a host computing system for use in a determination of whether to adjust an operating frequency of a processor unit polling a packet queue of the plurality of packet queues.

8. The system of claim 1, wherein facilitating differential rate processing comprises assigning a packet flow to a default packet queue based on per-flow analytics information for the packet flow and subsequently providing a portion of the per-flow analytics information to a host computing system responsive to a burst of packets of the packet flow for use in determination of whether to raise an operating frequency of a processor unit polling the default packet queue.

9. The system of claim 1, wherein the circuitry of the network interface controller is further to, based on sizes of a plurality of packets of the first packet flow, send information to cause a processing unit that is processing packets of the first packet queue to increase its frequency.

10. The system of claim 1, wherein the circuitry of the network interface controller is further to assign a packet flow to a high priority packet queue based on a determination that the packet flow includes packets of a relatively small size, wherein the high priority packet queue is processed at a higher frequency than at least one other packet queue to which the network interface controller assigns packet flows.

11. A method comprising:
determining, by a network interface controller, per-flow analytics information for a plurality of packet flows received by a network interface controller; and
facilitating differential rate processing of a plurality of packet queues for the plurality of packet flows based on the per-flow analytics information, wherein a first packet flow of the plurality of packet flows is assigned to a first packet queue of the plurality of packet queues based upon sizes of packets of the first packet flow.

12. The method of claim 11, wherein the per-flow analytics information comprises per-flow size metrics for the plurality of packet flows.

13. The method of claim 12, wherein the per-flow size metrics comprise an average packet size of a packet flow.

14. The method of claim 11, wherein the differential rate processing comprises polling of a plurality of packet queues by a plurality of processor units set to operate at different frequencies.

15. The method of claim 11, wherein the differential rate processing comprises changing a frequency of a processor unit polling a packet queue of the plurality of packet queues.

16. A system comprising:
a plurality of processor units, wherein at least one of the plurality of processor units is to poll a plurality of packet queues of a network interface controller; and
circuitry to implement differential rate processing of the plurality of packet queues by the plurality of processor units based on per-flow analytics information generated by the network interface controller, wherein a frequency at which a processor unit processes packets of a packet flow is based on sizes of packets of the packet flow.

17. The system of claim 16, wherein implementing differential rate processing of the plurality of packet queues comprises assigning processor units operating at different frequencies to poll the plurality of packet queues.

18. The system of claim 16, wherein implementing differential rate processing of the plurality of packet queues comprises dynamically varying a frequency of a processor unit of the plurality of processor units based on at least a portion of the per-flow analytics information generated by the network interface controller.

19. The system of claim 18, wherein the circuitry is to set a timer in association with a change in the frequency of the processor unit and to cause the processor unit to revert back to a default frequency upon expiration of the timer.

20. The system of claim 18, wherein dynamically varying the frequency of the processor unit of the plurality of processor units is further based on platform data of a host computing system comprising the processor units.

21. The system of claim 20, wherein the platform data comprises a power budget for at least a portion of the host computing system.

22. The system of claim 16, wherein the per-flow analytics information generated by the network interface controller comprises an analytics score for a packet flow.

23. One or more non-transitory computer-readable media with code stored thereon, wherein the code is executable to cause a machine to:
implement differential rate processing, by a plurality of processor units, of a plurality of packet queues of a network interface controller based on per-flow analytics information generated by the network interface controller, wherein a packet flow is assigned to be processed by a processor unit of the plurality of processor units based on sizes of packets of the packet flow.

24. The media of claim 23, wherein implementing differential rate processing of the plurality of packet queues comprises assigning processor units operating at different frequencies to poll the plurality of packet queues.

25. The media of claim 23, wherein the code is to cause the machine to implement differential rate processing of the plurality of packet queues by dynamically varying a frequency of a processor unit of the plurality of processor units based on at least a portion of the per-flow analytics information generated by the network interface controller.

26. The media of claim 25, wherein the code is to cause the machine to set a timer in association with a change in the frequency of the processor unit and to cause the processor unit to revert back to a default frequency upon expiration of the timer.

27. The media of claim 25, wherein dynamically varying the frequency of the processor unit of the plurality of processor units is further based on platform data of a host computing system comprising the plurality of processor units.

* * * * *